United States Patent
Yu et al.

(10) Patent No.: US 8,041,803 B2
(45) Date of Patent: Oct. 18, 2011

(54) METHOD AND SYSTEM FOR DELIVERING FILES IN DIGITAL FILE MARKETPLACE

(75) Inventors: Chee Yu, Dublin, CA (US); Greg Gardner, San Francisco, CA (US); Vijay Vaidyanathan, Los Altos Hills, CA (US); Antonio Dias, Sunnyvale, CA (US); Christopher A. Kitze, Incline Village, NV (US)

(73) Assignee: Qurio Holdings, Inc., Raleigh, NC (US)

( * ) Notice: Subject to any disclaimer, the term of this patent is extended or adjusted under 35 U.S.C. 154(b) by 1750 days.

(21) Appl. No.: 10/159,224

(22) Filed: May 31, 2002

(65) Prior Publication Data

US 2003/0061287 A1 Mar. 27, 2003

Related U.S. Application Data

(63) Continuation-in-part of application No. 09/963,812, filed on Sep. 26, 2001.

(51) Int. Cl.
*G06F 15/16* (2006.01)

(52) U.S. Cl. .......................... 709/224; 709/227; 709/225

(58) Field of Classification Search .................. 709/217, 709/224, 225, 227
See application file for complete search history.

(56) References Cited

U.S. PATENT DOCUMENTS

| | | |
|---|---|---|
| 5,247,575 A | 9/1993 | Sprague et al. |
| 5,774,654 A | 6/1998 | Maki |
| 5,794,210 A | 8/1998 | Goldhaber et al. |
| 5,819,092 A | 10/1998 | Ferguson et al. |
| 5,825,883 A | 10/1998 | Archibald et al. |
| 5,848,398 A | 12/1998 | Martin et al. |
| 5,855,008 A | 12/1998 | Goldhaber et al. |
| 5,864,620 A | 1/1999 | Pettitt |
| 5,892,900 A | 4/1999 | Ginter et al. |
| 5,982,891 A | 11/1999 | Ginter et al. |
| 6,009,415 A | 12/1999 | Shurling et al. |

(Continued)

OTHER PUBLICATIONS

Robert Bellone, "A Dozen of the Hottest Verticals," (article), Apr. 1996, 10 pages, Accounting Technology, vol. 12, No. 3, p. 29, Boston.

(Continued)

*Primary Examiner* — Larry Donaghue
(74) *Attorney, Agent, or Firm* — Withrow & Terranova, PLLC (57) ABSTRACT

A method and system for delivering digital files in a peer-to-peer network comprising a plurality of nodes including at least one server is disclosed. The network includes a plurality of files that are available for accessibility by the nodes in which respective fingerprints are computed for each of the files based on content of the files. The method and system include partitioning each of the files into a plurality of file chunks, and assigning an error detecting code to each of the chunks. The file is then transmitted to a first node from at least one other node by transmitting the chunks of the file to the first node. The method and system further include computing a new error detecting code upon receipt of each chunk by the first node, and comparing the new error detecting code to the assigned error detecting code to verify that each chunk has been transmitted correctly, whereby the entire contents of the file does not have to be received before the first node discovers that the file is corrupt. In a further embodiment of the present invention, the method and system include determining the bandwidth contributed by each node that successfully transmitted a chunk of the file, and paying an owner of each node a fee based on the contributed bandwidth.

18 Claims, 8 Drawing Sheets

U.S. PATENT DOCUMENTS

| | | | |
|---|---|---|---|
| 6,029,141 | A | 2/2000 | Bezos et al. |
| 6,041,316 | A | 3/2000 | Allen |
| 6,078,866 | A | 6/2000 | Buck et al. |
| 6,112,181 | A | 8/2000 | Shear et al. |
| 6,141,784 | A * | 10/2000 | Davis et al. ............... 714/748 |
| 6,192,407 | B1 | 2/2001 | Smith et al. |
| 6,202,056 | B1 | 3/2001 | Nuttall |
| 6,236,971 | B1 | 5/2001 | Stefik et al. |
| 6,247,130 | B1 | 6/2001 | Fritsch |
| 6,260,040 | B1 | 7/2001 | Kauffman et al. |
| 6,269,361 | B1 | 7/2001 | Davis et al. |
| 6,282,653 | B1 | 8/2001 | Berstis et al. |
| 6,381,228 | B1 | 4/2002 | Prieto, Jr. et al. |
| 6,385,596 | B1 | 5/2002 | Wiser et al. |
| 6,581,837 | B1 | 6/2003 | Hattersley |
| 6,697,944 | B1 | 2/2004 | Jones et al. |
| 6,721,780 | B1 | 4/2004 | Kasriel et al. |
| 6,742,023 | B1 * | 5/2004 | Fanning et al. ............... 709/219 |
| 6,826,594 | B1 | 11/2004 | Pettersen |
| 6,961,714 | B1 | 11/2005 | LeVine |
| 7,272,645 | B2 * | 9/2007 | Chang et al. ............... 709/223 |
| 7,363,498 | B2 * | 4/2008 | Hennessey et al. ........... 713/176 |
| 7,584,261 | B1 * | 9/2009 | Teodosiu et al. ............. 709/217 |
| 2001/0032154 | A1 | 10/2001 | Schummer |
| 2001/0051996 | A1 * | 12/2001 | Cooper et al. ............... 709/217 |
| 2002/0007322 | A1 | 1/2002 | Stromberg |
| 2002/0048372 | A1 * | 4/2002 | Toh et al. ............... 380/285 |
| 2002/0049760 | A1 * | 4/2002 | Scott et al. ............... 707/10 |
| 2002/0055920 | A1 * | 5/2002 | Fanning et al. ............... 707/3 |
| 2002/0062290 | A1 | 5/2002 | Ricci |
| 2002/0066026 | A1 | 5/2002 | Yau et al. |
| 2002/0077930 | A1 | 6/2002 | Trubey et al. |
| 2002/0082997 | A1 | 6/2002 | Kobata et al. |
| 2002/0138362 | A1 * | 9/2002 | Kitze et al. ............... 705/26 |
| 2002/0146122 | A1 | 10/2002 | Vestergaard et al. |
| 2002/0152874 | A1 | 10/2002 | Vilcauskas et al. |
| 2002/0198930 | A1 * | 12/2002 | Jones et al. ............... 709/201 |
| 2003/0009578 | A1 * | 1/2003 | Apostolopoulos et al. ... 709/231 |
| 2003/0023505 | A1 | 1/2003 | Eglen et al. |
| 2003/0023687 | A1 | 1/2003 | Wolfe |
| 2003/0079222 | A1 * | 4/2003 | Boykin et al. ............... 725/31 |
| 2003/0103645 | A1 * | 6/2003 | Levy et al. ............... 382/100 |
| 2004/0037449 | A1 * | 2/2004 | Davis et al. ............... 382/100 |
| 2004/0138966 | A1 | 7/2004 | Kopelman et al. |
| 2004/0199474 | A1 * | 10/2004 | Ritter ............... 705/65 |
| 2005/0198388 | A1 * | 9/2005 | Teodosiu et al. ............. 709/245 |
| 2006/0149806 | A1 * | 7/2006 | Scott et al. ............... 709/201 |
| 2007/0005432 | A1 | 1/2007 | Likourezos et al. |

OTHER PUBLICATIONS

Daniel J. Gervais, "Electronic Rights management and Digital Identifier Systems," (article), Dec. 14-15, 1998, 25 pages, Advisory Committee on Management of Copyright and Related Rights in Global Information Networks, Geneva, http://quod.lib.umich.edu/cgi/t/text/text-idx?c=jep;view=text;rgn=main;idno=3336451.0004.303.

* cited by examiner

METHOD AND SYSTEM FOR DELIVERING FILES IN DIGITAL FILE MARKETPLACE

CROSS-REFERENCE TO RELATED APPLICATIONS

This application is a continuation-in-part of U.S. patent application Ser. No. 09/963,812, entitled "Method And System For Generating Revenue In A Peer-To-Peer File Delivery Network" (2060P), filed on Sep. 26, 2001, which is incorporated by reference herein.

FIELD OF THE INVENTION

The present invention relates to an electronic marketplace for the buying and selling of digital files, and more particularly to method and system for delivering files in such a marketplace.

BACKGROUND OF THE INVENTION

U.S. patent application Ser. No. 09/883,064, filed Jun. 15, 2001, assigned to the assignee of the present application, discloses a technique for accessing information in a peer-to-peer network. Each file accessible in the peer-to-peer network is assigned a respective hash ID or fingerprint ID which is used to describe the contents of that file. A conventional hash or fingerprinting algorithm analyzes the contents of a selected file and generates a unique hash ID or fingerprint ID that is used for identifying the specific contents of that file. The hashing algorithm is designed such that no two files having different file content will have the same hash ID. However, files having identical file content will have the same hash ID.

Files in the peer-to-peer network are then identified and/or accessed based upon their associated hash ID values. In this way it is possible to identify identical files stored in the peer-to-peer network which have different file names and/or other metadata descriptors. Additionally, since the content of all files having the same hash ID will be identical, an automated process may be used to retrieve the desired content from one or more of the identified files. For example, a user may elect to retrieve a desired file (having an associated hash ID) which may be stored at one or more remote locations in the peer-to-peer network. Rather than the user having to select a specific location for accessing and retrieving the desired file, an automated process may use the hash ID (associated with the desired file) to automatically select one or more remote locations for retrieving the desired file.

The automated process may choose to retrieve the entire file contents of the desired file from a specific remote location, or may choose to receive selected portions of the file contents of the desired file from different remote locations in the peer-to-peer network. Further, if an error occurs during the file transfer process, resulting in a partial file transfer, the automated process may be configured to identify the portion(s) of the desired file which were not retrieved, and automatically select at least one different remote location for retrieving the remaining contents of the desired file.

Although retrieving portions of the file from different remote locations may speed the file transfer process, one disadvantage of the process is that it cannot be determined if the file is corrupt until all the portions of the file are received. For example, assume a user is downloading a movie and the movie is being retrieved in multiple portions from multiple locations. Only after all the portions of the movie are retrieved is an attempt made to reassemble the movie and generate a new fingerprint ID. The new fingerprint ID is then compared with the known fingerprint ID, and the movie is determined to be corrupt if there is no match. Certain portions of the file may also be corrupted by a hacker who intentionally sends corrupt file portions (e.g. a virus) to the unsuspecting user downloading the file. In either case, spending the time to download the entire contents of the file before determining it is corrupt is a waste of the user's time and network bandwidth.

An additional disadvantage is that the peer nodes in a peer-to-peer network may be of different configurations and may have disparate network connection capabilities. In a public peer-to-peer network, for example, some peers may be home PC's with 56 k modem connections, while others may be high-speed corporate workstation with T3 connections. Consequently, some nodes in the network may be less reliable than others. With the current scheme for retrieving files in the network, there is currently no easy process for determining which peer nodes are producing the file transfer errors. Therefore, it is difficult to increase the overall reliability of the peer-to-peer network. An additional problem current peer-to-peer networks, is that there is no incentive to induce users to donate their peer devices to the network to serve files to other users.

Accordingly, what is needed is an improved method and system for distributing digital files in a peer-to-peer network. The method and system should reduce the impact of file transfer errors, weed out unreliable peer nodes, and reward users who allow their peer devices to serve files, thereby increasing bandwidth of the network. The present invention addresses such needs.

SUMMARY OF THE INVENTION

The present invention is a method and system for delivering digital files in a peer-to-peer network comprising a plurality of nodes including at least one server. The network includes a plurality of files in which respective fingerprints are computed for each of the files based on the content of the files. The method and system include partitioning each of the files into a plurality of file chunks, and assigning an error detecting code to each of the chunks. The file is then transmitted to a first node from at least one other node by transmitting the chunks of the file to the first node. The method and system further include computing a new error detecting code upon receipt of each chunk by the first node, and comparing the new error detecting code to the assigned error detecting code to verify that each chunk has been transmitted correctly. In a further embodiment of the present invention, the method and system include reporting and black listing nodes that committed errors, and determining the bandwidth contributed by each node that successfully transmitted a chunk of the file, and paying an owner of each node a fee based on the contributed bandwidth.

According to the method and system disclosed herein, by assigning error detecting codes to each of the file chunks and verifying each chunk upon receipt means that the entire contents of the file do not have to be received before discovering that the file is corrupt, thereby reducing the impact of transfer errors. In addition, by paying owners who allow their computers to server files, the present invention provides an incentive for users to donate unused bandwidth of their computers to the network, thereby increasing overall bandwidth of the network. Bandwidth is further increased because a node can share a chunk with other nodes as soon as the chunk is received, rather than having to wait until the entire contents of the file are received.

DETAILED DESCRIPTION

The present invention relates to an electronic marketplace for digital files. The following description is presented to enable one of ordinary skill in the art to make and use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a method for delivering files in a peer-to-peer network that reduces the impact of errors. The network enables secure and reliable peer-to-peer file sharing between client nodes where users may share content using both 1-to-1 and 1-to-many file transfers without the need for going through a server.

Figure 1A:
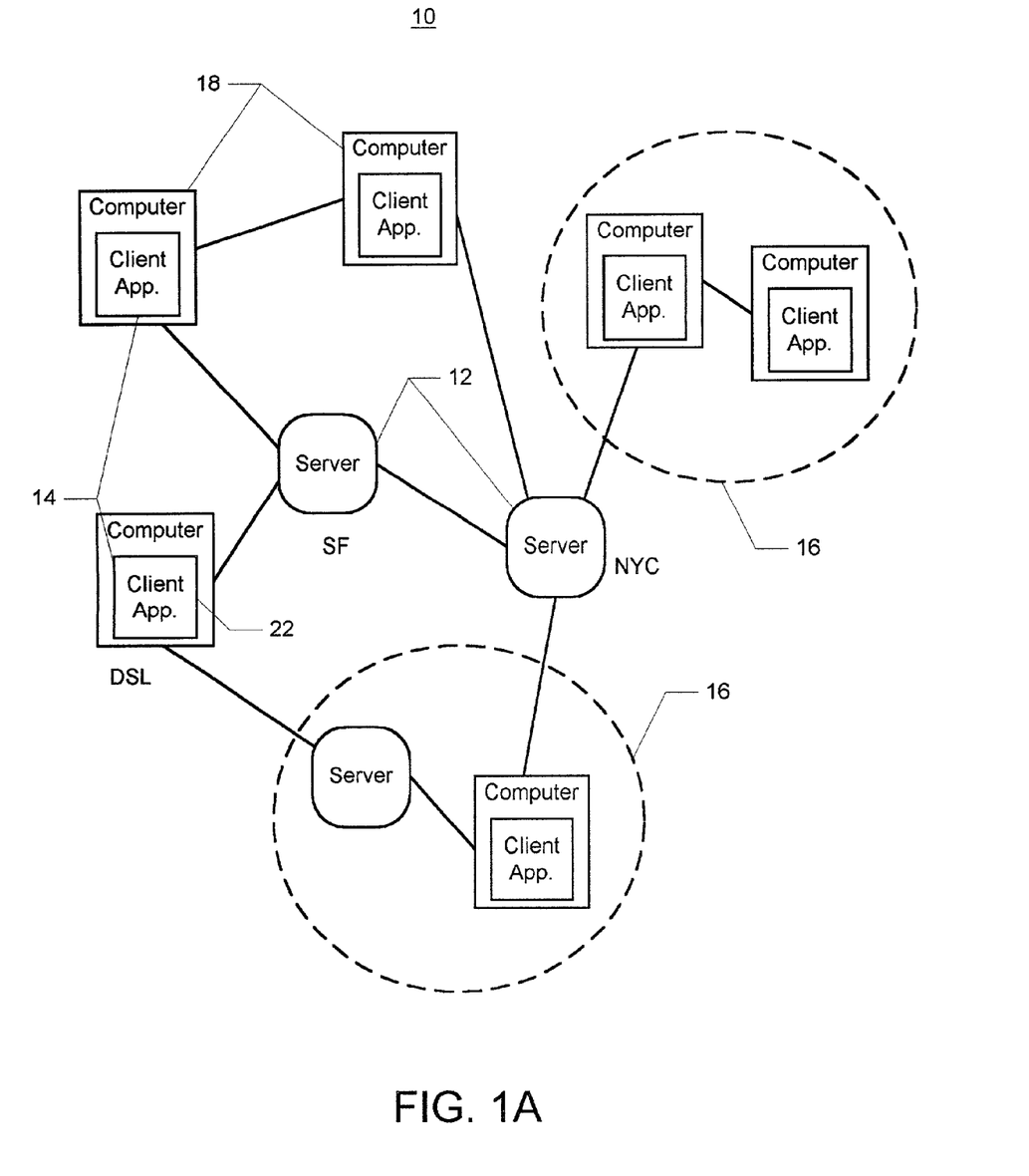
FIGS. 1A and 1B are block diagrams illustrating a peer-to-peer (P2P) network architecture in accordance with one preferred embodiment of the present invention.
Figure 1B:
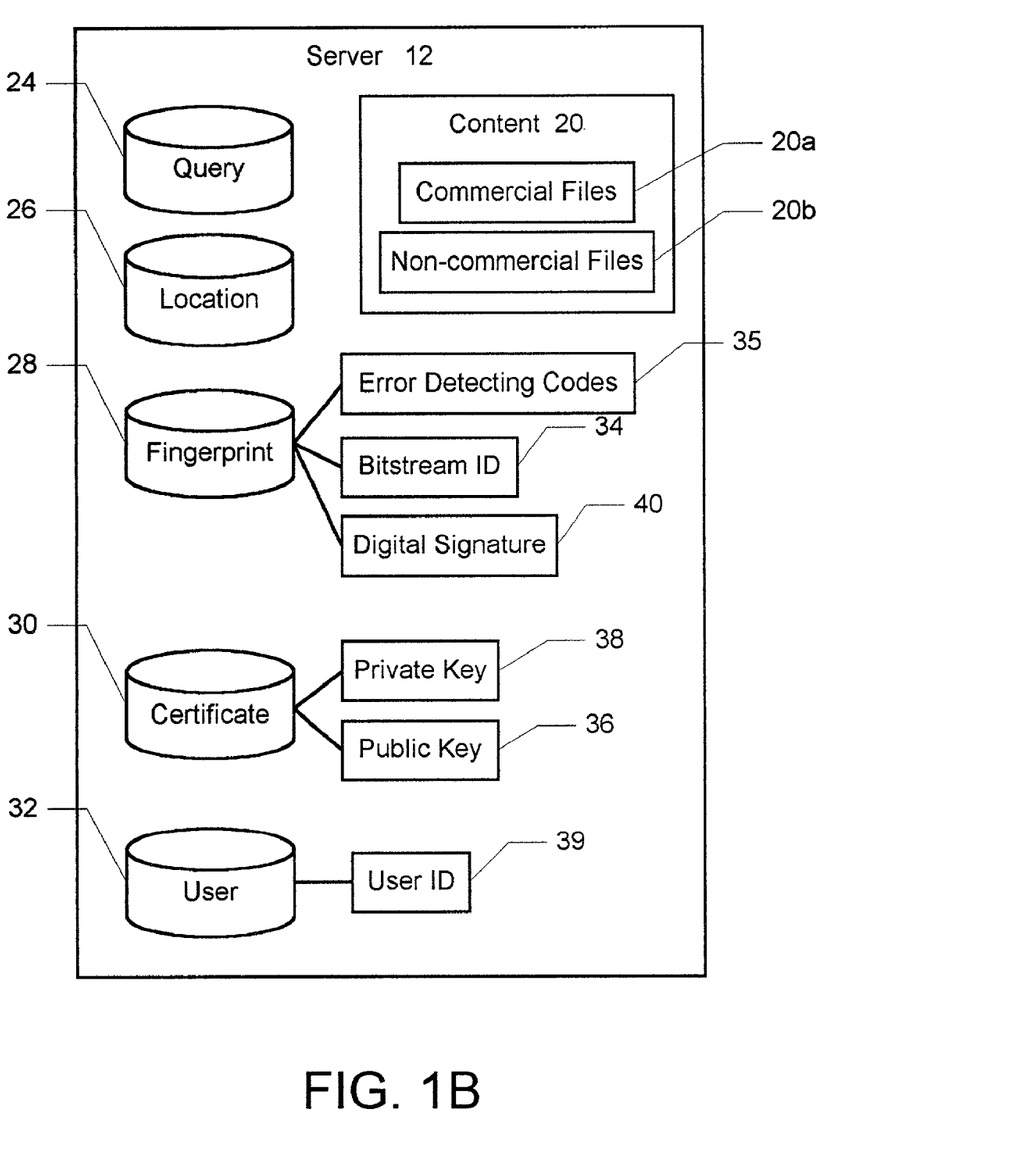

FIGS. 1A and 1B are block diagrams illustrating a peer-to-peer (P2P) network architecture in accordance with one preferred embodiment of the present invention. The peer-to-peer network 10 includes a plurality of computers 18 interconnected over a public network, such as Internet, where some of the computers 18 are configured as server nodes 12, and other computers 18 are configured as client nodes 14. A client node 14 may represent a single computer or a proprietary network, such as AOL, or a cable network, for example, and in a preferred embodiment, the server nodes 14 are located worldwide.

A computer 18 becomes a client node 14 by installing and running a P2P client application 22 designed for public networks that operates as described herein. In operation, the client application 22 allows the client node 14 to authenticate other client nodes 14 and to both receive content 20 and serve content 20.

Any combination of server nodes 12 and client nodes 14 may form extranets 16 that are protected by firewalls (not shown). As is well known in the art, an extranet 16 is basically a private network that uses the public Internet as its transmission system, but requires passwords to gain entrance.

FIG. 1B is a diagram illustrating contents of the server nodes 12. A server node 12 as used herein may refer to any computer that combines hosting services with databases. The server node 12 includes the file authority or query database 24, the location database 26, a fingerprint database 28, a certificate database 30, and a user database 32. The query and a location databases 24 and 26 store the metadata and locations of the files shared on the network, respectively. The fingerprint database 28 stores fingerprint information that is generated for each file for determining the authenticity of the files. The certificate database 30 contains certificate information to certify and verify the authenticity of all users of the file network 10. And the user database 32 includes account information for the users of the client nodes 14.

Through the servers 12, the network 10 provides an online marketplace for digital files 20 that enables merchants to sell any digital content, and to have the content delivered to any appropriate digital electronic device. In one embodiment, the digital content takes the form of a single file, a copy of which is delivered to users that fulfill the payment rules instituted by the merchant. In a preferred embodiment, each server node 12 stores content 20 that comprises both commercial files 20a and noncommercial files 20b. Example types of files 20 may include audio files, video files, news articles and online magazines, image files, and confidential documents, for instance. In other embodiments, the file 20 itself is merely a token; for instance, a license key or a unique ticket number that allows the user access to a region of a web site, or, it may even denote permission to access a physical location, live event or even physical goods.

When publishing a file 20 on the network 10, the merchant or content owner identifies certain business rules for each item being sold. A unique identifier is then associated with each item sold or transferred via the network 10. In a preferred embodiment, the identifier resembles an Internet URI (Uniform Resource Identifier), referred to herein as a YURI. Thus, when publishing the file 20, the content owner defines all the rules associated with a YURI and uploads the file 20 to the server node 12, preferably in XML format.

The information about the file (e.g. size of the file, mime type, etc.), and the business rules (e.g. whether the file is a pay-per-view, the retail price, and so on) are stored in a query database 24 as metadata. Information about where the file 20 is available on the network 10 is preferably stored in the location database 26. The query and location databases 24 and 26, combined with payment and account functions, described below, enable the online marketplace for digital goods.

Each file 20 published on the network 10 may be partitioned into chunks such that when a file 20 is to be downloaded to a particular node 14, the chunks are downloaded from different nodes 14 in the network. According to one aspect of the present invention, each chunk of the file 20 is further assigned an error detecting code 35. As the receiving peer node 14 receives each of the respective chunks of the file 20, the receiving peer node 14 computes the error detecting codes 35 and compares them to the known error detecting codes 35 to detect errors in both the content and transmission of the file 20. If an error is detected, resulting in a partial file transfer, the portion(s) of the file having the error is identified, and retransmitted from the same or different location. The node 14 causing the error is also reported to the sever 12 and will no longer be allowed to serve files if the number of errors it produces passes a predetermined threshold. Black listing nodes 14 in this manner increases the overall reliability of the network 10.

The server nodes 12 facilitate the file sharing process by performing a combination of the following functions. A first function of the server nodes 12 is to process search requests from the client nodes for files and to provide the results. A second function of the server nodes 12 is to aid the client nodes 14 in authenticating other client nodes 14 and file transfers during direct client-node transfers. A third function is content delivery, which includes a) providing subscription-based decentralized file downloads that allow the client nodes 14 to subscribe and automatically receive periodically updated files (push technology), and b) storing files when a client node 14 publishes a file for subsequent delivery to a requester by the server when the publishing node is off-line.

A fourth function of the server nodes (and the client nodes) is to serve as proxies to the extranets so that the client nodes 14 inside the extranets can be part of the peer-to-peer network 10 through the extranet firewalls.

Figure 2:
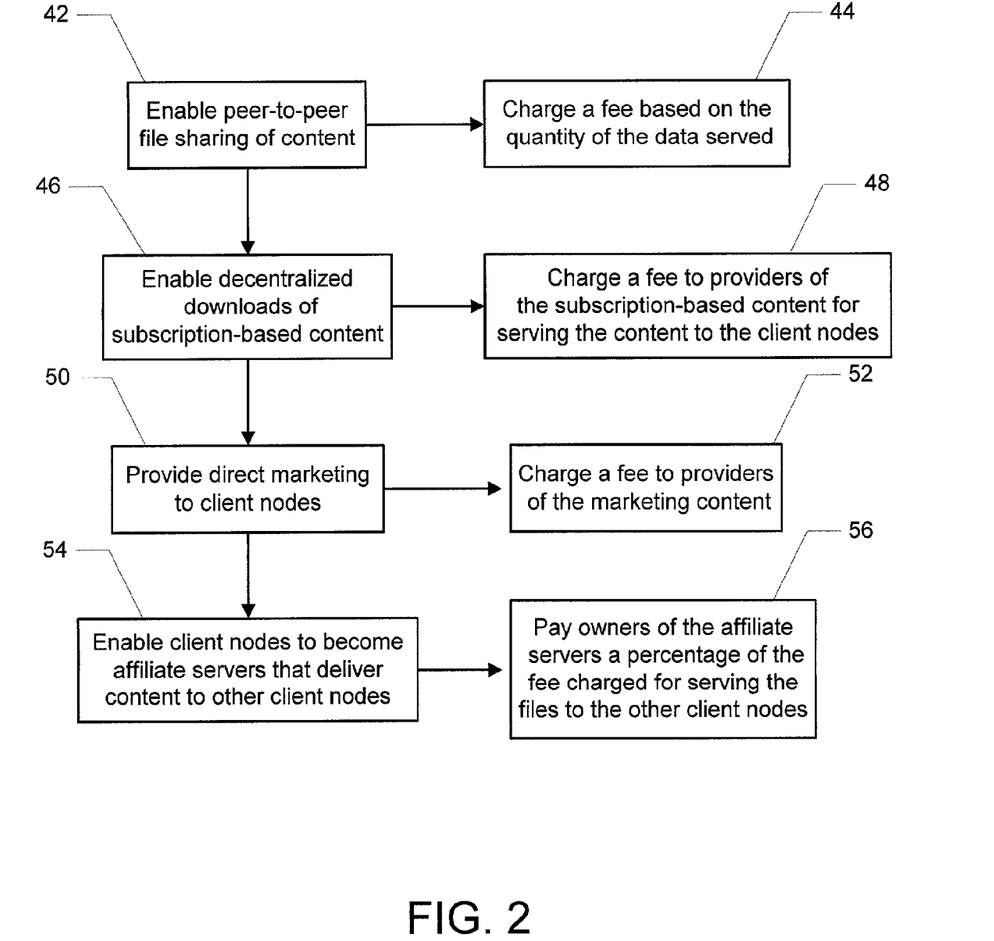
FIG. 2 is a flow chart illustrating a method for generating revenue from the peer-to-peer network in accordance with one preferred embodiment.

FIG. 2 is a flow chart illustrating a method for generating revenue from the peer-to-peer network in accordance with one preferred embodiment. Revenue may be generated from the peer-to-peer network by providing a novel combination of file sharing services. One service provided for generating revenue is enabling peer-to-peer file sharing of content 20 in step 42, and charging a fee based on the quantity of the data served in step 44. As used herein, peer-to-peer file sharing refers to the initiation of a file download by a client node 14 from either the server node 12 or another client node 14. Content made available for downloading in this manner may be referred to as "on demand" content because the content is available for downloading by the client nodes 14 at anytime. In a preferred embodiment, on demand content includes both fee-based content and free content. If the content downloaded is free to a user, then the provider of the content may be charged a fee for the serving of the content based on the quantity of the data transferred. If the content downloaded is fee-based, however, then the user of the initiating client node 14 may be charged the downloading fee.

The second service provided for generating revenue in the network 10 is enabling decentralized downloads of subscription-based content in step 46. According to one aspect of the present invention, client nodes 14 may subscribe to one or more of the subscription-based content, and in return, the subscribed to content is periodically sent to each the respective subscribing client nodes 14 either from the server node 12 or from another nearby client node 14. Providers of the subscription-based content are then charged a fee for the serving the content to the client nodes in step 48.

In a preferred embodiment, the subscription-based content may be made available for free or for a fee (e.g., pay-per-view files). If the content if fee-based, then a fee may be charged to the users of the subscribing client nodes for receiving or opening the fee-based content. The fee charged to the users may be in addition to, or in lieu of, the fee charged to the providers of the subscription-based content. The fee charged to the content providers may be based on a priority level chosen for delivering the particular content, and the quantity of data delivered. A high priority means that the content will be allocated adequate bandwidth to deliver the file within a particular time frame and at the exclusion of other file deliveries if necessary.

The third service provided for generating revenue in the network 10 is providing direct marketing to client nodes 14, where marketing content, such as advertisements, are sent directly to the client nodes 14 from the server node 12 as well as from other client nodes 14 in step 50. As user's become members of the network 10, statistics are kept and provided to the marketing content providers for analysis. The providers may then specify which users should be targeted for which types of marketing content. A fee may then be charged to providers of the marketing content in step 52.

The fourth service provided for generating revenue and the network 10 is enabling client nodes 14 to become affiliate servers that deliver content to other client nodes 14 in step 54. For example, college students that own computers and fast Internet connections may enroll as affiliate servers, thereby providing the network 10 with additional bandwidth to serve files. As an incentive, the owners of the affiliate servers may be paid a percentage of the fee charged for serving the files to the other client nodes 14 or a fixed fee in step 56.

FIGS. 3A-3E are flow charts illustrating the process for providing secure and reliable file sharing in a peer-to-peer network in accordance with a preferred embodiment of the present invention. The process begins by allowing a user to become a member of the network 10 by downloading and installing a copy of the P2P client application 22 on the user's computer 18 in step 100. In a preferred embodiment, the P2P client application 22 is downloaded from one of the server nodes 12, although the P2P client application 22 may be obtained from other sources.

Figure 3A:
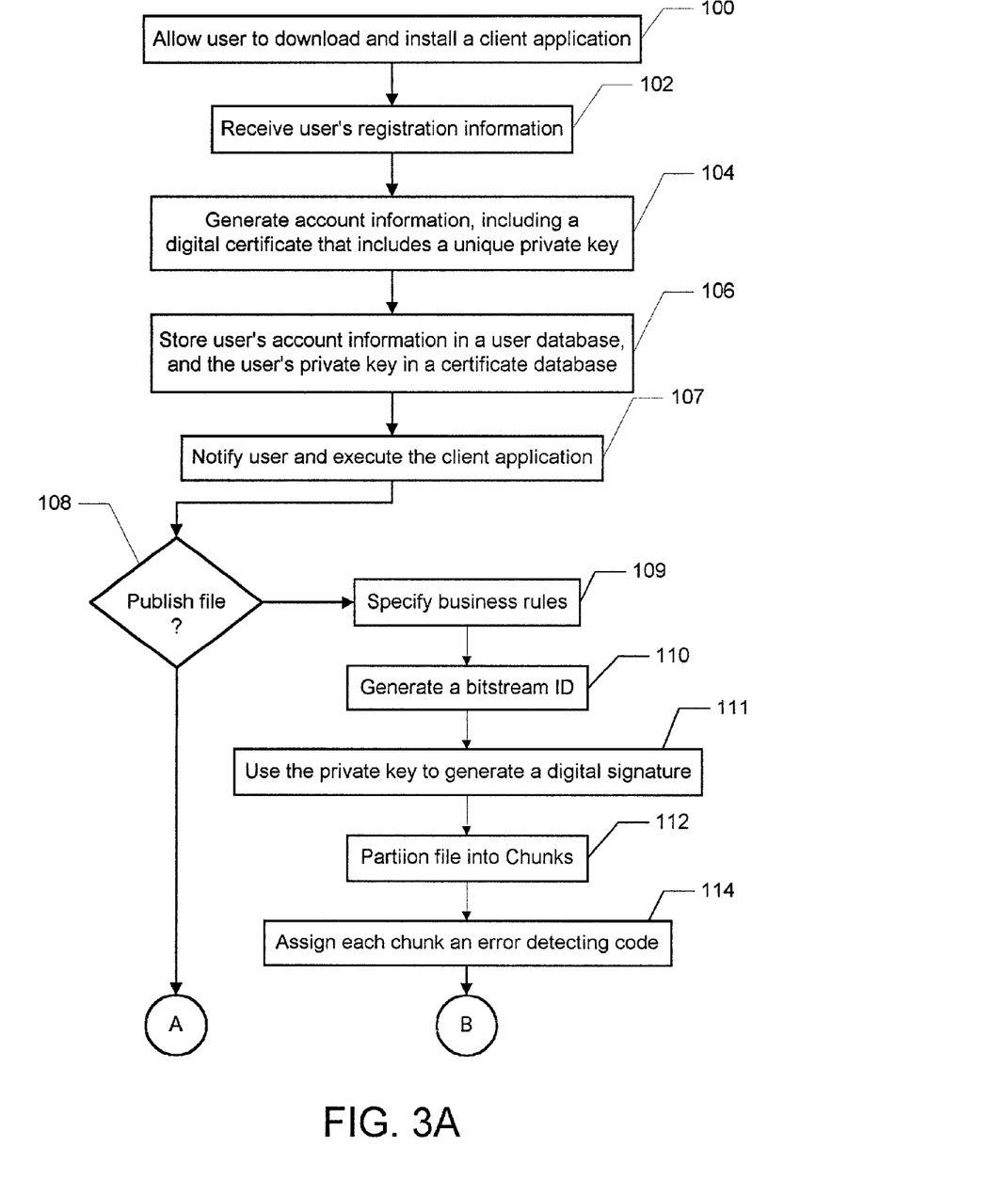
FIGS. 3A-3E are flow charts illustrating the process for providing secure and reliable file sharing in a peer-to-peer network in accordance with a preferred embodiment of the present invention.

Next, the server node 12 receives registration information entered by the user in step 102, which can include billing information, e-mail address, and demographic information for direct marketing purposes. In response, the server node 12 generates account information for the user, including a digital certificate that includes a public key 36 and a private key 38 in step 104. The user's account information, such as the user ID 39, is stored in the user database 32, and the user's public key 36 and private key 38 are stored in the certificate database 30 in step 106. When registration is complete, the user is notified and may then execute the P2P client application 22 in step 107. At any point during the registration process, the consumer may be requested to deposit a sum of money to his or her account, which will be used for fee-based file in which the fees are deducted from the consumer's account based on usage.

Once the client node 68 invokes the client application 22, a client application 22 browser window (not shown) is displayed on the computer in which the consumer may publish files 12 and search for files 12 on the network to download.

The P2P client application 22 allows the consumer to both publish and share files over the network in step 108, and download files over the network 10 in step 126. The content owner 14 may share files 12 on the network in step 108 either publicly or privately. When publishing a file 12, the content owner 14 specifies the business rules that are to be associated with file in step 109. Examples of business rules include whether the item is to be sold via pay-per-download, the retail price to download the file, whether the file is available for subscription, and so on.

In accordance with the present invention, secure and reliable file transfers are enabled by creating a fingerprint for each file when the file is published via steps 110-112. First, the P2P client application 22 uses a conventional hash or fingerprinting algorithm to analyze the contents of the file and generate a bitstream ID 34 in step 109. In a preferred embodiment, the bitstream ID 34 is generated by calculating binary values in data blocks of the file itself. The hashing algorithm is designed such that no two files having different file content will have the same hash ID. However, files having identical file content will have the same hash ID. Well-known one-way hashing algorithms that may be used include MD5 (Message Digest 5) and SHA-1 (Secure Hash Algorithm-1).

The P2P client application 22 then uses the private key 88 to generate a digital signature 90 for the file in step 111. In an alternative embodiment, the private key 88 may also be used to encrypt the bitstream ID.

In a preferred embodiment, the bitstream ID 84, the file information, and the digital signature 90 form the fingerprint for the file, thus ensuring that the file is transmitted in its original state (data integrity) by the identified consumer/publisher. In an alternative embodiment, only the bitstream ID 84 and optionally the file information may form the fingerprint for the file.

Figure 3B:
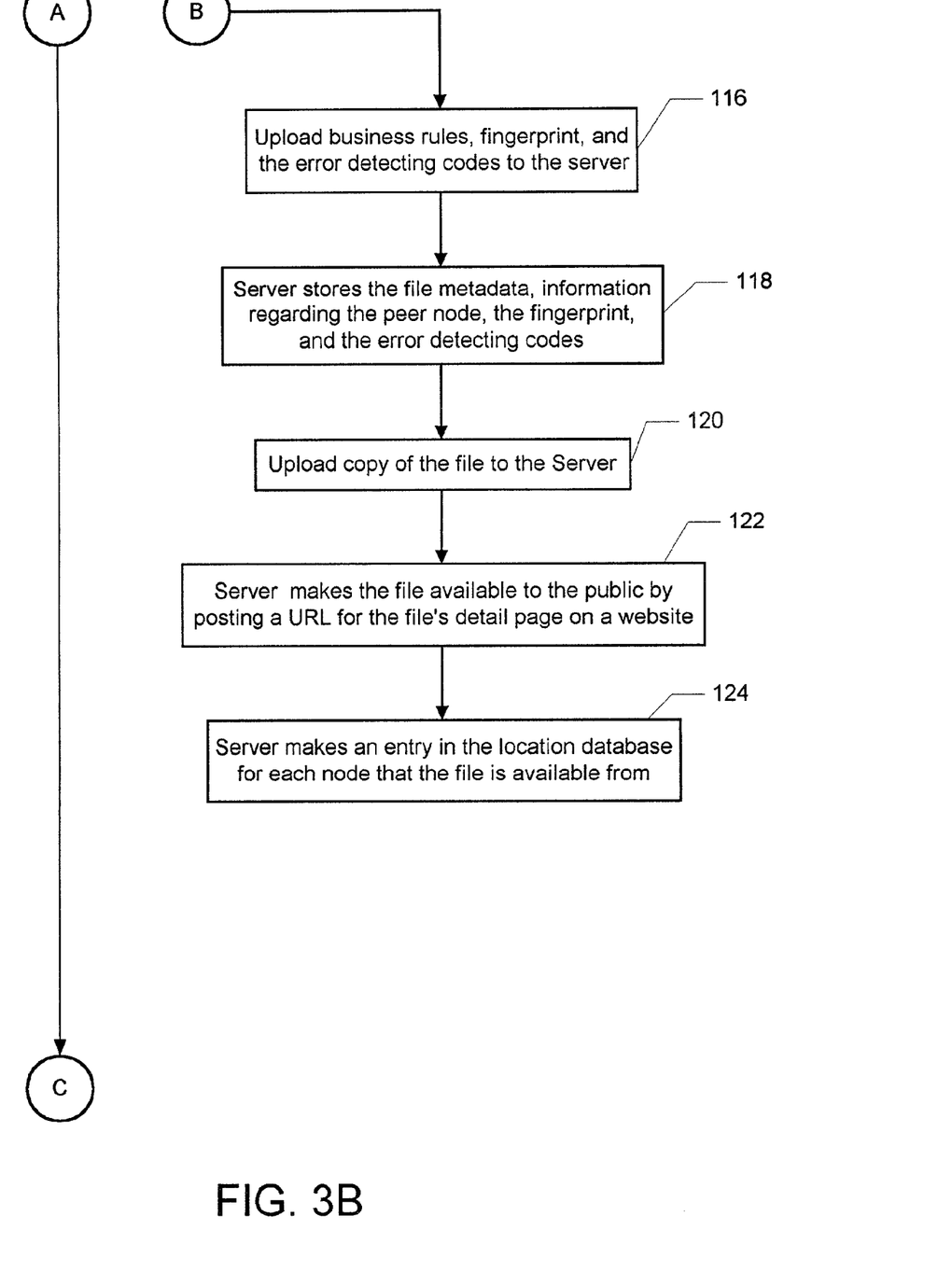

After the fingerprint ID 84 has been generated for the file, in step 112, the file is partitioned into separate portions called chunks. According to one aspect of the present invention, in step 114, each chunk is analyzed and assigned an error detecting code 35. As is well-known in the art, an error detecting code 35 is a bit or set of bits that are calculated as a function of the analyzed bits. There are many different kinds of error detecting codes 35 that may be used, including parity bit, longitudinal redundancy check, and cyclic redundancy check (CRC), for example. In a preferred embodiment, CRC32 is used as the error detecting code 35.

After the error detecting codes 35 are assigned to the chunks, the business rules associated with the file, the fingerprint, and the error detecting codes 35 are uploaded to the server 12 in step 116. In step 118, the server stores the file information or metadata, information regarding the peer node 14, the file fingerprint, and the error detecting codes 35 for the file chunks. Preferably, the server 12 stores the file information in the query database 24, and stores peer node 14 information, such as the peer ID and bandwidth speed of the peer node 14 and the URL of the file on the peer node, in the location database 26. The bitstream ID 84 and digital signature 90 may be stored in the fingerprint database 78 under an entry for the file.

In step 120, a copy of the file may also be uploaded to the server 12. After the file data has been uploaded to the server 12, in step 122, the server 12 makes the file available to the public by posting a URL for the file's detail page on a website. Since the content owner usually chooses to make the file available from his own peer node, both URLs are entered into the location database 26 for the file. In step 124, the server node 12 makes an entry in the location database 26 under the file for each node in the network 10 that the file is available from. All the entries in the query database 24 are also made available to a search engine to allow consumers to search for files 12 on the network in step 114 by entering search terms.

Figure 3C:
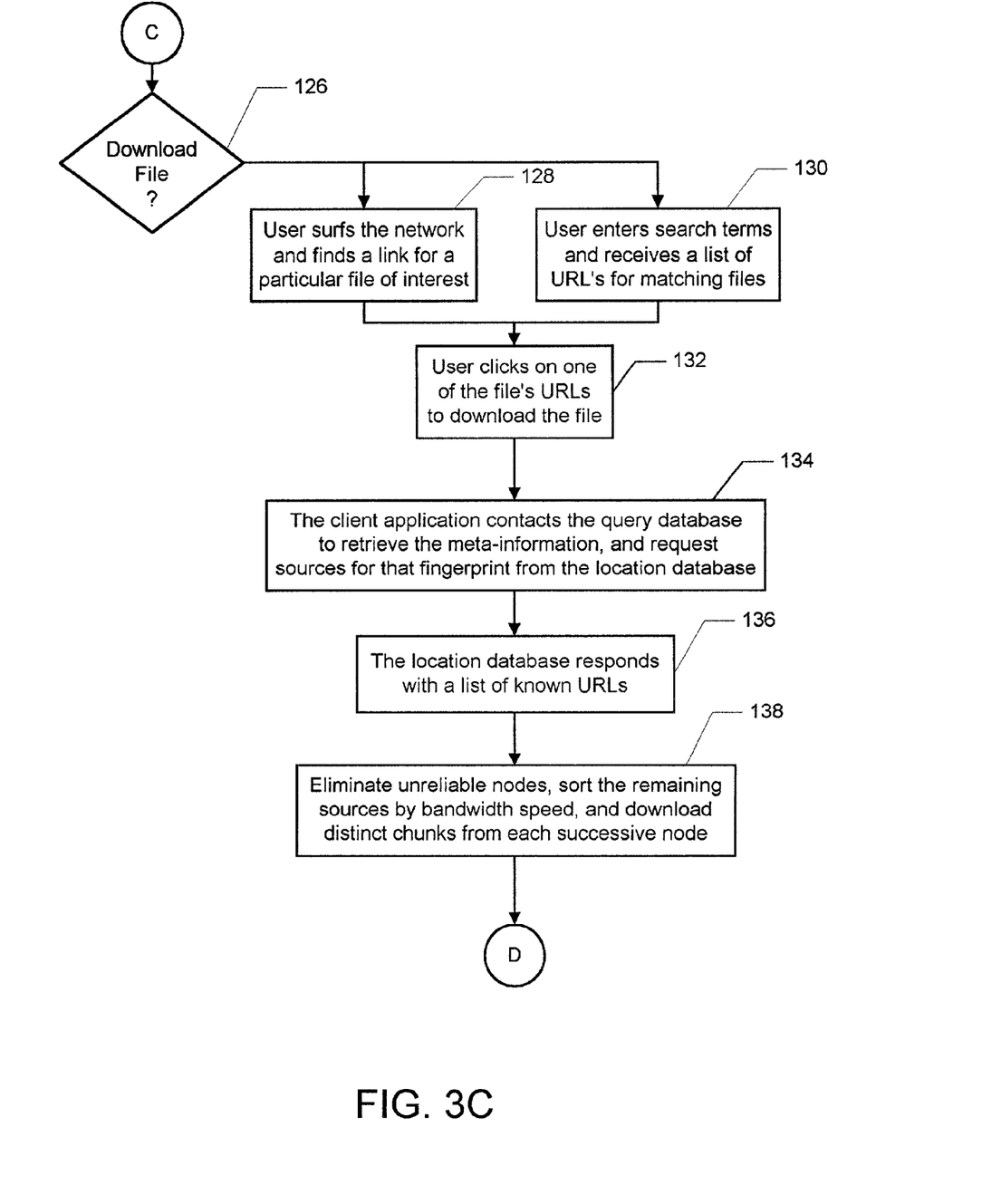

In step 126, the user may choose to download a particular file from the network. This can be done by the user web surfing and finding a link for a particular file of interest in step 128, or by entering search terms into the server's search engine in step 130 and receiving in response a list of URL's for files having metadata in the query database 24 that match the search terms.

In step 132, the user clicks on one of the file URLs to download the file, which causes the client application 22 to initiate the download process. In step 134, the client application 22 contacts the query database 24 to retrieve the meta-information, including the fingerprint and the error detection codes, and request all known sources for that fingerprint from the location database 26. Note that the location database 26 maintains sources indexed by fingerprint, thus enabling multiple occurrences of a file—even if they are named differently—to all be treated as valid sources to ensure the quickest and most reliable download possible.

In step 136, the location database 26 responds with a list of known URLs, some of which may be inaccessible to the client application 22. In step 138, the client application 22 eliminates unreliable nodes, sorts the remaining sources by bandwidth speed, and begins to download distinct chunks from successive nodes on the list. Because faster nodes download chunks faster than slower nodes, the client application 22 dispatches new requests to these fast nodes. Finally, if some slow nodes still have not completed for filling the requests, the client application 22 closes the connection to the slow nodes and complete requests by redirecting unfinished request to the slow nodes. As soon as a chunk is successfully received, the node may report it to the server for the purpose of serving the chunk to other nodes, even before all the chunks are received.

Figure 3D:
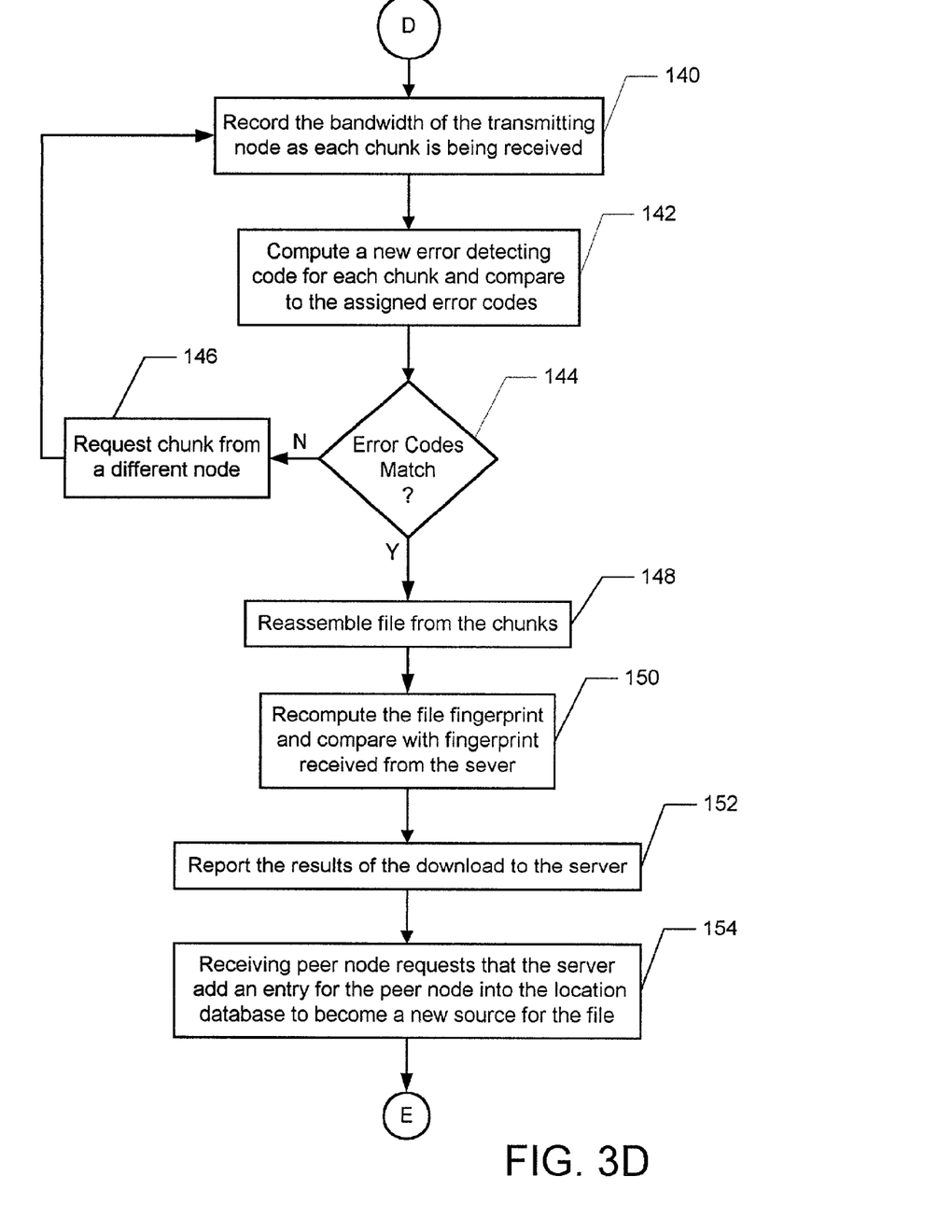

In step 140, the client application 22 records the bandwidth of each respective transmitting node as each chunk is being received. In step 142, after receipt of each chunk, the client application 22 computes a new error detecting code 35 for the chunk and compares it to the assigned error detecting code 35 to verify that the chunk has been transmitted correctly. If the error detecting codes 35 of a particular chunk do not match in step 144, the chunk is requested from a different node in step 146, and the process continues at step 140.

In step 148, once all the chunks have been received without error, the file is reassembled from the chunks. In step 150, the client application 22 recomputes the fingerprint for the file and compares it with the fingerprint received from the server node 12 to verify that the file is an exact replica of the original file supplied by the content owner. In the embodiment where a public key is used to encrypt the fingerprint, the client application 22 also receives the public key from the server node 12. The public key is used to decrypt the digital signature 90 in the fingerprint, and a new bitstream ID is generated and compared with the bitstream ID 84 in the fingerprint. If the digital signature is successfully decrypted and the two bitstream ID's match, then the file is authenticated. In the embodiment where the bitstream ID is encrypted, the encrypted bitstream ID in the fingerprint must be decrypted with the public key before the comparison. Fingerprinting files 12 as described herein allows the receiving node to determine the authenticity of both the file and the publisher.

In step 152, after the file has been successfully downloaded and verified, the client application 22 reports the results of the download to the server 12, including which nodes served which chunks, the result of the transmission, the number of bytes received from each node, and the download time. In step 154, the receiving peer node may then request that the server node 12 add an entry for the peer node into the location database 26, thereby advertising itself as a new source for the file. The server node 12 may first inspect the peer node's address and makes a determination about whether this new source is behind a firewall or not.

Figure 3E:
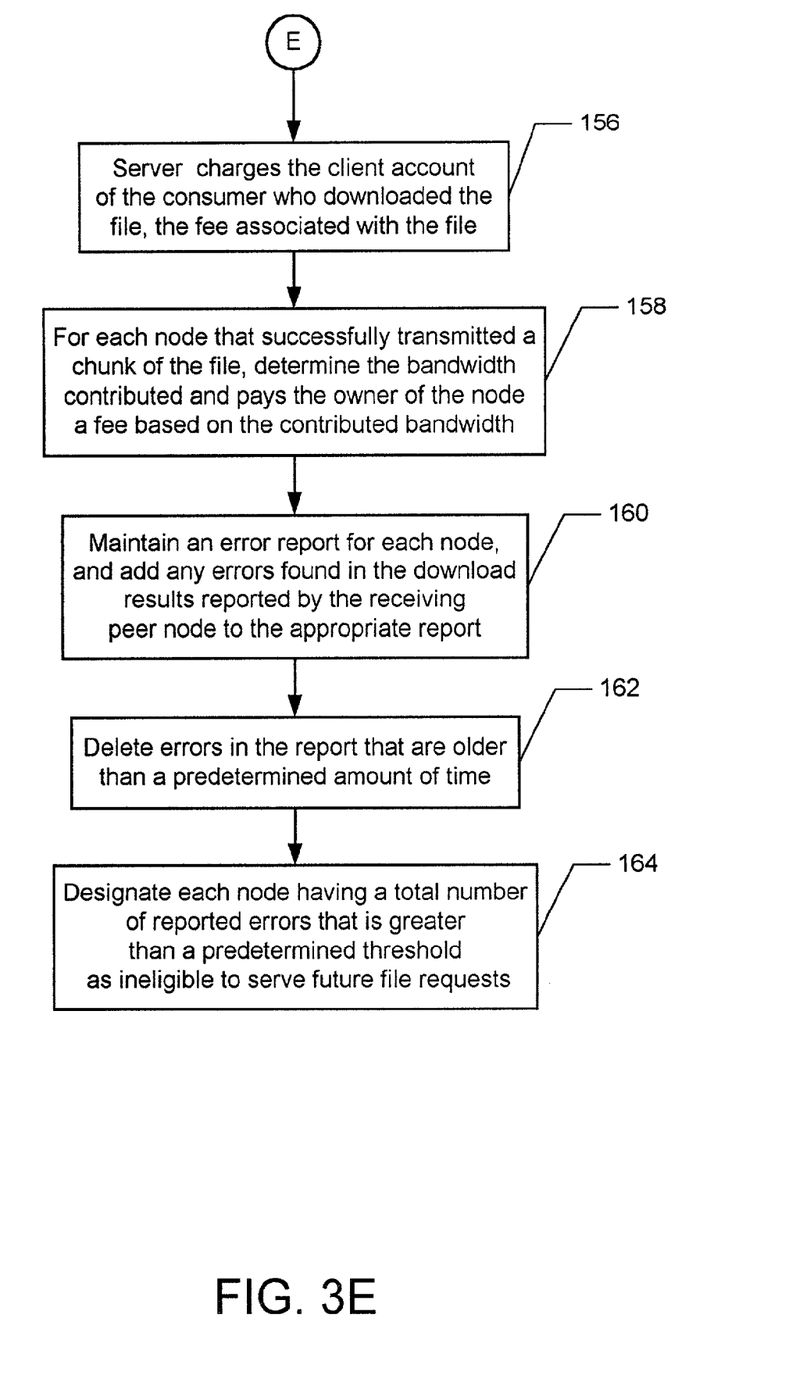

In step 156, in response to a successful reported download, the server node 12 charges the client account of the consumer who downloaded the file, the fee associated with the file.

According to a second aspect of the present invention, in step 158, for each node that successfully transmitted a chunk of the file, the server 12 determines the bandwidth contributed (e.g., the number of bytes transmitted) and pays the owner of the node a fee based on the contributed bandwidth. By paying affiliates, the present invention provides an incentive for users to donate unused bandwidth of their computers to the network, thereby increasing overall bandwidth of the network.

According to a third aspect of the present invention, in step 160, the server 12 maintains an error report for each node and adds any errors found in the download results reported by the receiving peer node to the appropriate report. In step 162, any reported errors that are older than a predetermined amount of time are deleted from the report to eliminate stale data. In step 164, each node having a total number of reported errors that is greater than a predetermined threshold is designated by the server node 12 as ineligible to serve future file requests. Consequently, unreliable nodes are black listed and because they are not used to serve files, the impact of errors occurring on the network is substantially reduced, thereby increasing overall speed and reliability of the network.

A method and system for efficiently delivering digital files in a peer-to-peer network has been disclosed. Although the present invention has been described in accordance with the embodiments shown, one of ordinary skill in the art will readily recognize that there could be variations to the embodiments and those variations would be within the spirit and scope of the present invention. For example, a file that is being published on the network may be partitioned into chunks and the chunks assigned error detecting codes by the server rather than the publishing peer node. Accordingly, many modifications may be made by one of ordinary skill in the art without departing from the spirit and scope of the appended claims.

In one embodiment, the invention may be embodied in a computer readable medium that contains program instructions for delivering digital files in a peer-to-peer network comprising a plurality of nodes including at least one server. The program instructions may be for making a plurality of files available on the network for accessibility by the nodes; computing a respective fingerprint for each of the digital files based on content of the files; partitioning each of the files into a plurality of file chunks; assigning an error detecting code to each of the chunks; transmitting the file to a first node from at least one other node by transmitting the chunks of the file to the first node; and upon receipt of each chunk by the first node, computing a new error detecting code and comparing the new error detecting code to the assigned error detecting code to verify that each chunk has been transmitted correctly, whereby the entire contents of the file does not have to be received before the first node discovers that the file is corrupt.

What is claimed is:

1. A method for obtaining a digital file in a peer-to-peer network, comprising:
    receiving a list comprising a plurality of URLs from a server, wherein each of the plurality of URLs identifies a location of a copy of a file on a different one of a plurality of nodes;
    receiving a plurality of precalculated error detecting codes from the server, wherein each of the plurality of precalculated error detecting codes corresponds to one of a plurality of file chunks of the file;
    concurrently initiating a plurality of requests for ones of the plurality of file chunks of the file, including a first request for a first file chunk from a first node of the plurality of nodes, a second request for a second file chunk from a second node of the plurality of nodes, and a third request for a third file chunk from a third node of the plurality of nodes;
    receiving the first file chunk, the second file chunk, and the third file chunk;
    calculating new error detecting codes for each of the first file chunk, the second file chunk, and the third file chunk in response to receiving the first, second and third file chunks, respectively;
    for each of the first, second, and third file chunks comparing the corresponding new error detecting code to a corresponding precalculated error detecting code from the list, and if the corresponding new error detecting code does not match the corresponding precalculated error detecting code, requesting a corresponding file chunk from one of the plurality of nodes that is a different node from the node from which the corresponding file chunk was originally received.

2. The method of claim 1 further including the step of: for each node that successfully transmitted a chunk of the digital file, determining bandwidth contributed by each node and paying an owner of each node a fee based on the contributed bandwidth.

3. The method of claim 2 further including the steps of: maintaining an error report for each node and designating each node having a total number of reported errors greater than a predetermined threshold as ineligible to serve future digital file requests.

4. The method of claim 1 further comprising partitioning the digital file such that each file chunk of the plurality of file chunks is a fixed sized block.

5. The method of claim 1 further comprising providing a cycle redundancy check (CRC) as an error detecting code.

6. The method of claim 1 wherein the digital file is published for sharing on the network from the second node, the method further including the step of:
    computing a respective fingerprint and assigning error detecting codes by the second node.

7. The method of claim 6 further including the step of: uploading business rules associated with the digital file, file metadata, the respective fingerprint, the plurality of file chunks, and the error detecting codes from the second node to the server.

8. The method of claim 7 further including the step of:
    storing the file metadata in a query database; and
    storing a peer identification (ID) and bandwidth speed of the second node and a URL of the digital file on the second node in a location database.

9. The method of claim 1 further including the steps of:
    reassembling the digital file from the plurality of file chunks; and
    recomputing a respective fingerprint for the digital file and comparing the respective fingerprint with a fingerprint received from the server to verify the digital file.

10. A non-transitory computer readable medium containing program instructions for receiving a digital file in a peer-to-peer network, the program instructions for:
    receiving a list comprising a plurality of URLs from a server, wherein each of the plurality of URLs identifies a location of a copy of a digital file on a different one of a plurality of nodes;
    receiving a plurality of precalculated error detecting codes from the first server, wherein each of the plurality of precalculated error detecting codes corresponds to one of a plurality of file chunks of the digital file;
    concurrently initiating a plurality of requests for ones of the plurality of file chunks of the digital file, including a first request for a first file chunk from a first node of the plurality of nodes, a second request for a second file chunk from a second node of the plurality of nodes, and a third request for a third file chunk from a third node of the plurality of nodes;
    receiving the first file chunk, the second file chunk, and the third file chunk;
    calculating new error detecting codes for each of the first file chunk, the second file chunk, and the third file chunk in response to receiving the first, second, and third file chunks, respectively;
    for each of the first, second, and third file chunks, comparing the corresponding new error detecting code to a corresponding precalculated error detecting code from the list, and if the corresponding new error detecting code does not match the corresponding precalculated error detecting code, requesting a corresponding file chunk from one of the plurality of nodes that is a different node from the node from which the corresponding file chunk was originally received.

11. The non-transitory computer readable medium of claim 10 further including the instruction of: for each node that successfully transmitted a chunk of the digital file, determining bandwidth contributed by each node and paying an owner of each node a fee based on the contributed bandwidth.

12. The non-transitory computer readable medium of claim 11 further including the instructions of: maintaining an error report for each node and designating each node having a total number of reported errors greater than a predetermined threshold as ineligible to serve future digital file requests.

13. The non-transitory computer readable medium of claim 10 further including the instruction of: partitioning the digital file such that each file chunk of the plurality of file chunks is a fixed sized block.

14. The non-transitory computer readable medium of claim 10 further including the instruction of: providing a cycle redundancy check (CRC) as the error detecting code.

15. The non-transitory computer readable medium of claim 10 wherein the digital file is published for sharing on the network from the second node, the computer readable medium further including the instruction of: computing a respective fingerprint and assigning error detecting codes by the second node.

16. The non-transitory computer readable medium of claim 15 further including the instruction of: uploading business rules associated with the digital file, file metadata, the respective fingerprint, the plurality of file chunks, and the error detecting codes from the second node to the server.

17. The non-transitory computer readable medium of claim 16 further including the instruction of:
    storing the file metadata in a query database; and
    storing a peer identification (ID) and bandwidth speed of the second node and a URL of the digital file on the second node in a location database.

18. A method for receiving a digital file in a peer-to-peer network, the method comprising the steps of:
    receiving a list comprising a plurality of URLs from a server, wherein each URL in the list identifies a corresponding node of a plurality of nodes that contains a copy of the digital file, wherein the digital file is partitioned into a plurality of file chunks on each of the plurality of nodes, and each of the plurality of file chunks has a corresponding error detecting code maintained on the server;
    receiving a second list comprising a plurality of corresponding error detecting codes from the server;
    eliminating at least one URL from the list of URLs based on an identifier indicating the node corresponding to the at least one URL is unreliable;
    sorting the list to place each URL in the list in an order according to a bandwidth speed associated with each of the corresponding nodes; and
    initiating a download of distinct chunks from a second plurality of nodes corresponding to a plurality of successive URLs in the list; and
    upon receipt of the distinct chunks, computing a new error detecting code and comparing the new error detecting code to the corresponding error detecting code to verify that each distinct chunk has been downloaded correctly; and
    requesting a chunk from a different node from an initial node from which the chunk was received if the new error detecting code associated with the chunk does not match the corresponding error detecting code associated with the chunk.

\* \* \* \* \*